United States Patent
Danguchi et al.

(10) Patent No.: US 12,441,346 B2
(45) Date of Patent: Oct. 14, 2025

(54) WORK VEHICLE

(71) Applicant: Yanmar Holdings Co., Ltd., Osaka (JP)

(72) Inventors: Masashi Danguchi, Chikugo (JP); Nagahiro Ogata, Chikugo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 69 days.

(21) Appl. No.: 18/025,827

(22) PCT Filed: Aug. 31, 2021

(86) PCT No.: PCT/JP2021/031936
§ 371 (c)(1),
(2) Date: Mar. 10, 2023

(87) PCT Pub. No.: WO2022/059477
PCT Pub. Date: Mar. 24, 2022

(65) Prior Publication Data
US 2023/0286525 A1 Sep. 14, 2023

(30) Foreign Application Priority Data

Sep. 18, 2020 (JP) ................................ 2020-157038

(51) Int. Cl.
*B60Q 1/00* (2006.01)
*B60W 40/08* (2012.01)
(Continued)

(52) U.S. Cl.
CPC ............ *B60W 50/14* (2013.01); *B60W 40/08* (2013.01); *E02F 9/226* (2013.01); *E02F 9/26* (2013.01);
(Continued)

(58) Field of Classification Search
CPC ................ B60W 50/14; B60W 40/08; B60W 2540/223; B60W 2040/0881;
(Continued)

(56) References Cited

U.S. PATENT DOCUMENTS

| 6,323,773 B1 * | 11/2001 | Runyon ................. G08B 21/24 340/567 |
| 7,324,013 B2 * | 1/2008 | Esson ................... G01S 13/931 340/474 |

(Continued)

FOREIGN PATENT DOCUMENTS

| JP | 2015-124514 A | 7/2015 |
| JP | 2016196759 A * | 11/2016 |

(Continued)

OTHER PUBLICATIONS

International Search Report dated Nov. 16, 2021 issued in corresponding PCT Application PCT/JP2021/031936.
(Continued)

*Primary Examiner* — Quang Pham
(74) *Attorney, Agent, or Firm* — NORTON ROSE FULBRIGHT US LLP

(57) ABSTRACT

A work vehicle includes a monitoring device which monitors the surroundings of the work vehicle; an alarm device which outputs an alarm on the basis of a monitoring result of the monitoring device; a posture detection unit which detects whether an operator sits on an operation seat of the work vehicle and is in an operation posture for operating the work vehicle; and a control unit which controls the alarm device on the basis of the result of detection by the posture detection unit. Based on detection by the posture detection unit that the operator is in the operation posture, the control unit causes the alarm device to output an alarm based on the monitoring result of the monitoring device, and based on detection by the posture detection unit that the operation (Continued)

posture of the operator is released, the control unit causes the alarm device to stop outputting the alarm based on the monitoring result of the monitoring device.

8 Claims, 4 Drawing Sheets

(51) Int. Cl.
  *B60W 50/14* (2020.01)
  *E02F 9/22* (2006.01)
  *E02F 9/26* (2006.01)
(52) U.S. Cl.
  CPC ............... *B60W 2040/0881* (2013.01); *B60W 2050/143* (2013.01); *B60W 2050/146* (2013.01); *B60W 2300/17* (2013.01); *B60W 2540/223* (2020.02)
(58) Field of Classification Search
  CPC ..... B60W 2050/143; B60W 2050/146; B60W 2300/17; E02F 9/226; E02F 9/26
  See application file for complete search history.

(56) References Cited

U.S. PATENT DOCUMENTS

| | | | | |
|---|---|---|---|---|
| 9,616,802 | B1* | 4/2017 | Kiriyama | G07C 9/00309 |
| 9,646,436 | B1* | 5/2017 | Campbell | G07C 9/00309 |
| 11,088,574 | B2* | 8/2021 | Niwa | H02J 50/80 |
| 2006/0244577 | A1* | 11/2006 | Tanaka | B60R 25/04 |
| | | | | 340/429 |
| 2006/0267781 | A1* | 11/2006 | Coulter | B60R 25/257 |
| | | | | 340/573.7 |
| 2012/0073892 | A1* | 3/2012 | Hunter | B60K 28/063 |
| | | | | 180/273 |
| 2014/0362220 | A1* | 12/2014 | Izumikawa | G01S 17/89 |
| | | | | 348/148 |
| 2017/0043681 | A1* | 2/2017 | Seiller | B60N 2/0029 |
| 2018/0148057 | A1* | 5/2018 | Khafagy | B60W 30/18054 |
| 2019/0135176 | A1* | 5/2019 | Miki | G06V 40/193 |
| 2019/0168776 | A1* | 6/2019 | Imaizumi | G06V 20/58 |
| 2019/0176737 | A1* | 6/2019 | Watanabe | G06V 20/58 |
| 2020/0216079 | A1* | 7/2020 | Mahajan | B60W 60/0051 |
| 2020/0392703 | A1* | 12/2020 | Sherlock | G01F 15/068 |
| 2020/0399863 | A1* | 12/2020 | Aizawa | G06Q 10/10 |
| 2021/0131065 | A1* | 5/2021 | Myers | B60T 8/321 |
| 2021/0298220 | A1* | 9/2021 | Kean | A01B 69/004 |
| 2021/0380069 | A1* | 12/2021 | Sielecki | B60R 22/48 |
| 2021/0382486 | A1* | 12/2021 | Jones | G01S 17/931 |
| 2022/0042285 | A1 | 2/2022 | Katayama et al. | |
| 2022/0145593 | A1* | 5/2022 | Yokota | E02F 9/2033 |
| 2023/0279638 | A1* | 9/2023 | Danguchi | E02F 9/24 |
| | | | | 701/50 |
| 2023/0279645 | A1* | 9/2023 | Danguchi | E02F 9/24 |
| 2023/0392352 | A1* | 12/2023 | Danguchi | B60R 1/27 |
| 2024/0003121 | A1* | 1/2024 | Okamoto | E02F 9/2033 |
| 2024/0141622 | A1* | 5/2024 | Danguchi | E02F 9/24 |
| 2024/0208327 | A1* | 6/2024 | Wataya | G05G 9/047 |

FOREIGN PATENT DOCUMENTS

| | | | |
|---|---|---|---|
| JP | 2019167820 A | * | 10/2019 |
| JP | 2020-063568 A | | 4/2020 |
| WO | 2019/172424 A1 | | 9/2019 |
| WO | 2020/080264 A1 | | 4/2020 |
| WO | 2020/162184 A1 | | 8/2020 |

OTHER PUBLICATIONS

Japanese Office Action dated Jul. 11, 2023 issued for JP Application No. 2020157038.

* cited by examiner

WORK VEHICLE

CROSS-REFERENCE TO RELATED APPLICATIONS

This application is a national stage application pursuant to 35 U.S.C. § 371 of International Application No. PCT/JP2021/031936, filed on Aug. 31, 2021, which claims priority under 35 U.S.C. § 119 to Japanese Patent Application No. 2020-157038 filed on Sep. 18, 2020, the disclosures of which are hereby incorporated by reference in their entireties.

TECHNICAL FIELD

The present disclosure relates to a work vehicle.

BACKGROUND ART

Conventionally, various types of work vehicles such as hydraulic excavator have been proposed. For example, in a work vehicle of Patent Literature 1, a switching position of a cutoff lever detects a state of whether or not work can be done by a work instrument, and a method of making a report at the time of detecting an obstacle is changed between a work-enabled state and a work-disabled state. Specifically, in the work-enabled state, a continuous report sound is sounded at the time of detecting an obstacle, and in the work-disabled state, an intermittent report sound is sounded at the time of detecting the obstacle.

CITATION LIST

Patent Literature

Patent Literature 1: Japanese Unexamined Patent Application Publication No. 2020-063568

DISCLOSURE OF INVENTION

Problems to be Solved by the Invention

However, a configuration that uniformly outputs an alarm at the time of having detected an obstacle may hinder an operator's action. For example, when the operator, while turning on an engine of a work vehicle, releases the seating thereby to release a posture for operating the work vehicle, and tries to visually check a work site, outputting an alarm based on detecting of an obstacle causes the operator to feel annoyed by the alarm and to fail to satisfactorily perform the visual check work.

The present invention has been made to solve the above problem, an object of which is to provide a work vehicle that, even when an operator releases an operation posture and visually checks a work site, enables the operator to satisfactorily perform the above check work without being annoyed by an alarm.

Means for Solving the Problems

A work vehicle according to an aspect of the present invention is a work vehicle performing work, includes: a monitoring device that monitors a surrounding of the work vehicle; an alarm device that outputs an alarm based on a monitoring result of the monitoring device; a posture detection unit that detects whether or not an operator is sitting on an operation seat of the work vehicle thereby to be in an operation posture for operating the work vehicle; and a control unit that controls the alarm device based on a detection result of the posture detection unit, wherein the control unit, when the posture detection unit detects that the operator is in the operation posture, causes the alarm device to execute the alarm's outputting that is based on the monitoring result of the monitoring device, and, when the posture detection unit detects that the operation posture of the operator is released, stops the executing of the alarm's outputting that is based on the monitoring result of the monitoring device and that is by the alarm device.

Effect of the Invention

According to the above configuration, even when the operator releases the operation posture and visually checks the work site, the operator will not be annoyed by the alarm. As a result, the visual check can be done satisfactorily (and comfortably).

DESCRIPTION OF EMBODIMENTS

The following is a description of an embodiment of the present invention based on the drawings.

[1. Work Vehicle]

Figure 1:
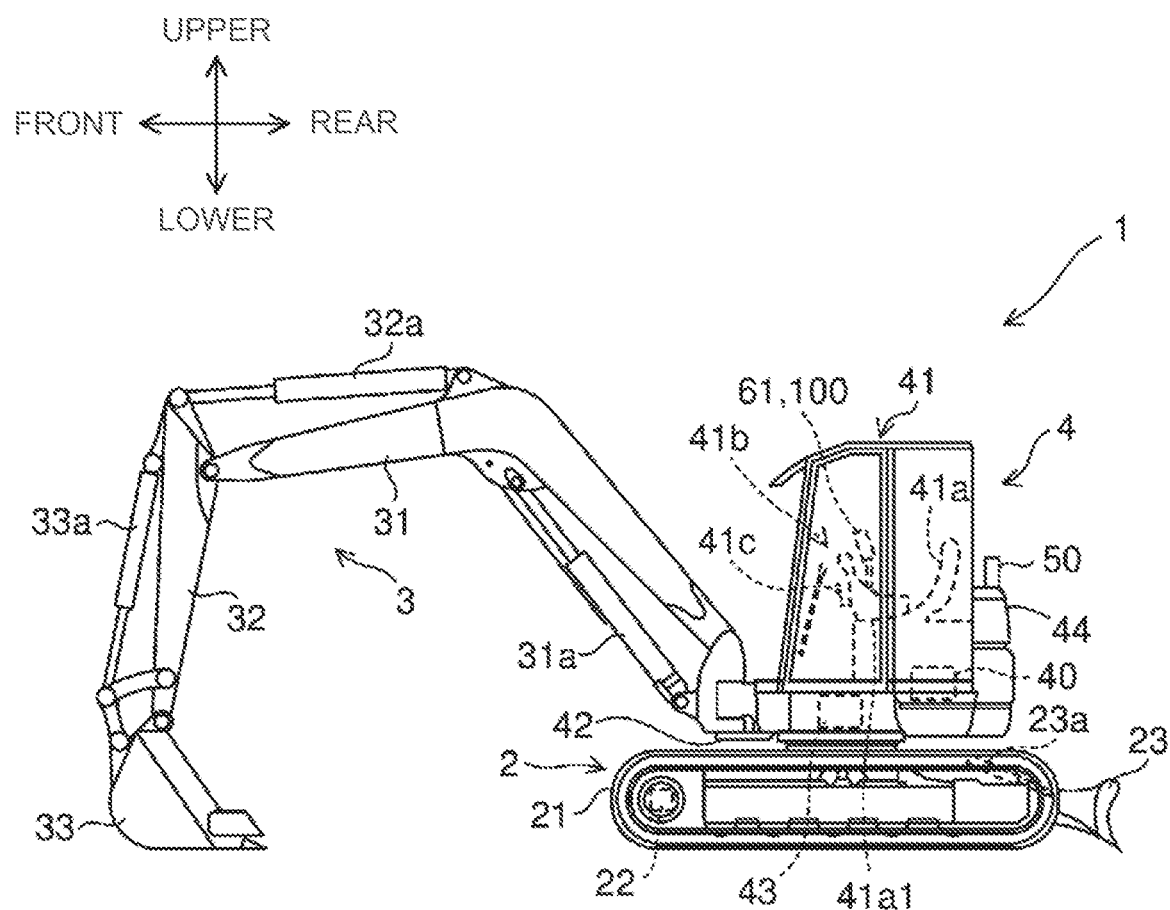
FIG. 1 is a side view showing a schematic configuration of a hydraulic excavator which is an example of a work vehicle according to an embodiment of the present invention.

FIG. 1 is a side view showing a schematic configuration of a hydraulic excavator 1 which is an example of a work vehicle according to the present embodiment. The hydraulic excavator 1 includes a lower run body 2, a work instrument 3, and an upper swing body 4.

Here, in FIG. 1, directions are defined as follows. First, the direction in which the lower run body 2 linearly travels is a front/rear direction, one side of which is "front" and the other side is "rear". In FIG. 1, a run motor 22 side relative to a blade 23 is shown as "front", as an example. Also, a transverse direction perpendicular to the front/rear direction is defined as a right/left direction. In this case, the left side is "left" and the right side is "right" as viewed from an operator seated at an operation seat 41a. Also, the gravity direction perpendicular to the front/back direction and the right/left direction is defined as the up/down direction, with the upstream side of the gravity direction being "up" and the downstream side of the gravity direction being "down".

The lower run body 2 is provided with a pair of right and left crawlers 21 and a pair of right and run motors 22. Each of the run motors 22 is a hydraulic motor. The right and left run motors 22 drive the right and left crawlers 21, respectively, thereby making it possible to move the hydraulic excavator 1 forward and rearward. The lower run body 2 is provided with a blade 23 for performing ground leveling work, and a blade cylinder 23a. The blade cylinder 23a is a hydraulic cylinder to rotate the blade 23 in the up/down direction.

The work instrument 3 has a boom 31, an arm 32, and a bucket 33. The boom 31, the arm 32, and the bucket 33 are each independently driven, thereby making it possible to perform the excavating work of earth, sand, etc. That is, the hydraulic excavator 1 is provided with the work instrument 3 that performs the work.

The boom 31 is rotated by a boom cylinder 31a. The boom cylinder 31a has a base end portion thereof supported by a front portion of the upper swing body 4, and is movable freely in an extendable and retractable manner. The arm 32 is rotated by an arm cylinder 32a. The arm cylinder 32a has a base end portion thereof supported by a tip portion of the boom 31, and is movable freely in an extendable and retractable manner. The bucket 33 is rotated by a bucket cylinder 33a. The bucket cylinder 33a has a base end portion thereof supported by a tip portion of the arm 32, and is movable freely in an extendable and retractable manner. The boom cylinder 31a, the arm cylinder 32a, and the bucket cylinder 33a each include a hydraulic cylinder CY (see FIG. 2).

The upper swing body 4 is configured to be swingable relative to the lower run body 2 via a swing bearing (not shown). In the upper swing body 4, an operation cabin 41, a swing table 42, a swing motor 43, an engine chamber 44, etc. are placed. Driving of the swing motor 43 as a hydraulic motor swings the upper swing body 4 via the swing bearing. At the rear portion of the upper swing body 4, there are placed the engine 40 to provide power to various portions, as well as plural hydraulic pumps P0 (see FIG. 2).

Each hydraulic pump P0 supplies hydraulic oil (pressure oil) to the hydraulic motor (e.g., right and left run motors 22, swing motor 43), and the hydraulic cylinder CY (e.g., blade cylinder 23a, boom cylinder 31a, arm cylinder 32a, bucket cylinder 33a). The hydraulic motor and the hydraulic cylinder that are driven with the hydraulic oil supplied from any of the hydraulic pumps P0 are collectively referred to as a hydraulic actuator AC (see FIG. 2).

The operation seat 41a is placed in the operation cabin 41 on which the operator gets. That is, the hydraulic excavator 1 is provided with the operation cabin 41 in which the operation seat 41a is placed and on which the operator rides. An operation unit 41b is placed around the operation seat 41a (especially in the front, left, and right).

The operation unit 41b includes an operation lever, a switch, a button, etc. to drive the hydraulic actuator AC. The operator, by sitting on the operation seat 41a and operating the operation unit 41b, drives the hydraulic actuator AC. This allows the lower run body 2 to run, the blade 23 to perform the ground leveling work, the work instrument 3 to perform the excavating work, and the upper swing body 4 to swing. That is, the hydraulic excavator 1 is provided with the hydraulic actuator AC for operating the work vehicle (hydraulic excavator 1), and the operation unit 41b for driving the hydraulic actuator AC.

Also, a cutoff lever 41c, which can be rotated up and down, is provided near the operation seat 41a. The operator, when pressing down the cutoff lever 41c, turns ON an after-described cutoff switch 90 (see FIG. 2), making it possible to operate the operation unit 41b thereby to drive the given hydraulic actuator AC (enabled state). Meanwhile, the operator, when pulling up the cutoff lever 41c, turns OFF the cutoff switch 90, causing a state (disabled state) incapable of driving the hydraulic actuator AC despite the operator operating the operation unit 41b. When attempting to get off the operation cabin 41, the operator pulls up the cutoff lever 41c thereby to disable the hydraulic actuator AC, and then leaves the operation seat 41a. In this way, the hydraulic excavator 1 is provided with the cutoff lever 41c for switching the operation of the operation unit 41b between an enabled state for driving the hydraulic actuator AC n and a disabled state for disabling the hydraulic actuator AC.

[2. Configuration of Main Portion of Hydraulic Excavator]

Figure 2:
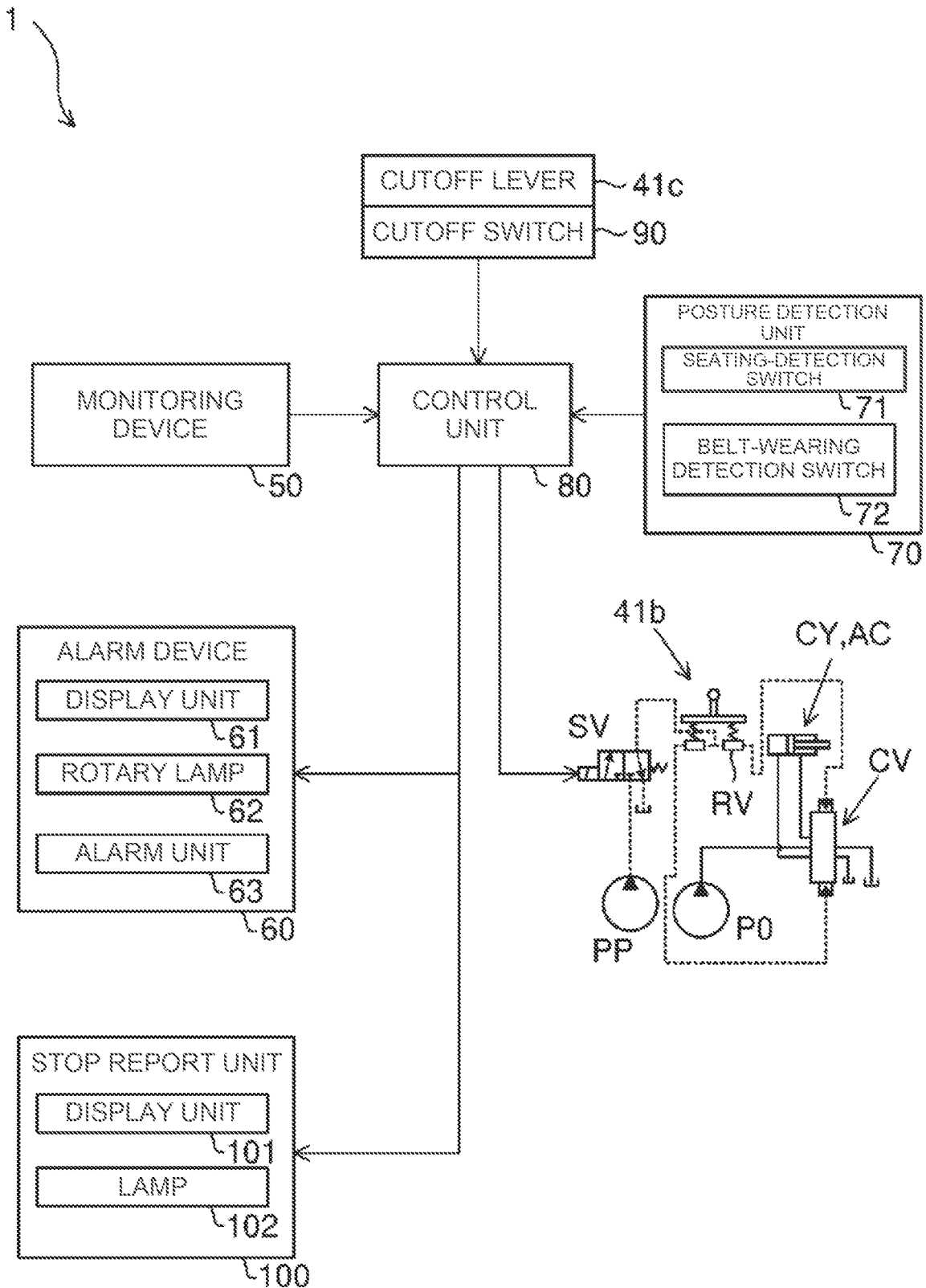
FIG. 2 is an explanatory diagram showing a configuration of a main portion of the above hydraulic excavator.

FIG. 2 schematically shows a configuration of a main portion of the hydraulic excavator 1. The hydraulic excavator 1 is further provided with a monitoring device 50, an alarm device 60, a posture detection unit 70, a control unit 80, a cutoff switch 90, and a stop report unit 100.

(2-1. Monitoring Device)

The monitoring device 50 has an obstacle sensor that detects the presence or absence of an obstacle around the hydraulic excavator 1 thereby to monitor the surroundings. Obstacles include a person, an object, an animal, and another to-be-monitored object. In the present embodiment, the obstacle sensor includes a right camera, a left camera, and a rear camera that take images of the right side, left side, and rear side of the hydraulic excavator 1, respectively. In this way, the hydraulic excavator 1 is provided with the monitoring device 50 that monitors the surroundings of the hydraulic excavator 1.

As long as an obstacle can be detected by the monitoring device 50 within the required range, the number of obstacle sensors, an installation location, and an installation method are not particularly limited. As the obstacle sensor, any known distance measuring device capable of acquiring distance information of an obstacle can be applied, other than the above cameras. For example, an ultrasonic radar using ultrasonic waves, a millimeter wave radar using millimeter wave band radio waves, a LIDER (Light Detection and Ranging) that measures a scattered light in response to laser radiation thereby to calculate a distance, and a stereo camera which is provided with plural cameras and measures the distance from a taken image to an object can be used as the obstacle sensor. The configuration may be for executing an image process on the taken image thereby to detect an intruder to a monitoring area.

(2-2. Alarm Device)

The alarm device 60 has a display unit 61, a rotary lamp 62, and an alarm unit 63. The display unit 61 includes a liquid crystal display device, for example, and displays, when the monitoring device 50 detects an obstacle, information showing that the obstacle has been detected. The display unit 61 is placed in a position visible, on the operation seat 41a, to the operator (see FIG. 1).

The rotary lamp 62 includes a lamp that rotates when the monitoring device 50 detects an obstacle. The alarm unit 63 includes a buzzer that outputs a sound when the monitoring device 50 detects an obstacle. Further, the alarm unit 63 may include an audio output unit that outputs a voice (electronic sound) when the monitoring device 50 detects an obstacle. The rotation of the lamp of the rotary lamp 62 and the alarm by a buzzer sound or voice output by the alarm unit 63 can cause the operator to recognize that the monitoring device 50 has detected an obstacle.

When the monitoring device 50 does not detect any obstacle, the alarm device 60 does not output the alarm. That is, the display unit 61 does not display the alarm, the rotary lamp 62 does not rotate, and the alarm unit 63 does not output the buzzer sound or voice. From this, it can be said that the hydraulic excavator 1 is provided with the alarm device 60 that outputs the alarm based on a monitoring result of the monitoring device 50.

(2-3. Posture Detection Unit)

The posture detection unit 70 has a seating-detection switch 71 and a belt-wearing detection switch 72. The seating-detection switch 71 is a sensor that detects the operator's sitting on a seat 41$a$1 of the operation seat 41$a$ (see FIG. 1), and a release of the operator's sitting. That is, the posture detection unit 70 includes the seating-detection switch 71 that detects the operator's sitting on the seat 41$a$1 of the operation seat 41$a$.

The seating-detection switch 71 is turned OFF when the operator is seated on the seat 41$a$1 of the operation seat 41$a$, and is turned ON when the operator is not seated on the seat 41$a$1 (when the seating is released). This allows the control unit 80 to determine the seating state (seated/not seated) of the operator based on a detection signal from the seating-detection switch 71.

The belt-wearing detection switch 72 is a sensor that detects whether or not a tang plate of a seat belt provided on the operation seat 41$a$ is inserted into a buckle, thereby to detect whether or not the operator has worn the seat belt. That is, the posture detection unit 70 includes the belt-wearing detection switch 72 that detects the wearing of the seat belt provided on the operation seat 41$a$. The posture detection unit 70 may be so configured as to have only one of the seating-detection switch 71 and the belt-wearing detection switch 72.

The belt-wearing detection switch 72 outputs a detection signal that is turned OFF when the operator wears the seat belt, and is turned ON when the operator releases the wearing of the seat belt. This allows the control unit 80 to determine, based on a detection signal from the belt-wearing detection switch 72, the seat belt wearing state (fitted/not fitted) by the operator.

When operating the operation unit 41$b$, the operator usually executes the operation in a state of being seated on the seat 41$a$1 of the operation seat 41$a$. When operating the operation unit 41$b$, the operator, after wearing the seat belt in a state of being seated on the seat 41$a$1, executes the operation. Thus, detecting whether or not the operator is seated on the seat 41$a$1 or detecting whether or not the operator is wearing the seat belt can detect whether or not the operator is in the posture for operating the hydraulic excavator 1 (hereinafter, also referred to as "operation posture"). From this, it can be said that the hydraulic excavator 1 has the posture detection unit 70 that detects whether or not the operator is in the operation posture in which the operator is seated on the operation seat 41$a$ of the hydraulic excavator 1 and steers the hydraulic excavator 1.

(2-4. Control Unit)

The control unit 80 controls the operation of each portion of the hydraulic excavator 1. In the present embodiment, the control unit 80 controls the output of the alarm device 60, in particular, based on a result of the posture detection unit 70's detecting of the operation posture of the operator. That is, the hydraulic excavator 1 is provided with the control unit 80 that controls the alarm device 60 based on the result of detection by the posture detection unit 70. The above control unit 80 includes an electronic control unit referred as to an ECU (Electronic Control Unit).

The control unit 80 may include a storage unit. The storage unit stores a program and various information to operate the control unit 80. A RAM (Random Access Memory), a ROM (Read Only Memory), and the like can be used as the above storage unit.

The control unit 80, when the posture detection unit 70 detects that the operator is in the operation posture, causes the alarm device 60 to execute the alarm's outputting that is based on the monitoring result of the monitoring device 50, and when the posture detection unit 70 detects that operation posture of the operator has been released, stops executing of the alarm's outputting that is based on the monitoring result of the monitoring device 50 and that is by the alarm device 60. Details of operation under the control by the control unit 80 is to be described below.

(2-5. Cutoff Switch)

The cutoff switch 90 is a sensor that detects a rotational position of the above cutoff lever 41$c$. That is, the hydraulic excavator 1 is provided with the cutoff switch 90 that detects the rotational position of a cutoff lever 41$c$. The cutoff switch 90 is turned ON when the cutoff lever 41$c$ is pressed down (rotated downward), and is turned OFF when the cutoff lever 41$c$ is pulled up (rotated upward).

The control unit 80, based on the cutoff lever 41$c$'s rotational position detected by the cutoff switch 90, determines whether or not the operation of the operation unit 41$b$ is in the enabled state or the disabled state. When the cutoff lever 41$c$ is being pressed down, the operation unit 41$b$ is in the enabled state as described above, making it possible to drive the hydraulic actuator AC. In this case, it is conceivable that the operator is seated on the operation seat 41$a$. Meanwhile, when the cutoff lever 41$c$ is being pulled up, the operation unit 41$b$ is in the disabled state, making it impossible to drive the hydraulic actuator AC. In this case, it is conceivable that the operator has got off or is about to get off the operation seat 41$a$.

Thus, based on the rotational position of the cutoff lever 41$c$, the control unit 80 determines whether or not the operation of the operation unit 41$b$ is in the enabled state or the disabled state, making it possible to determine whether or not the operator is riding on the operation cabin 41 (whether the operator has got off the operation cabin 41).

(2-6. Stop Report Unit)

When the alarm device 60, under the control by the control unit 80, has stopped the executing of the alarm's outputting based on the monitoring result of the monitoring device 50, the stop report unit 100 makes a report thereof. That is, the hydraulic excavator 1 is provided with the stop report unit 100 that, when the alarm device 60 has stopped the executing of the alarm's outputting that is based on the monitoring result of the monitoring device 50, makes the report that the executing of the alarm's outputting has been stopped.

The stop report unit 100 is provided in the operation cabin 41. In the operation cabin 41, the stop report unit 100 is placed at a position visible to the operator seated on the operation seat 41$a$ (e.g., diagonally forward to the right as viewed from the seated operator), for example. The above stop report unit 100 has a display unit 101, a lamp 102.

The display unit 101 includes a liquid crystal display device that displays various types of information. By displaying information showing the stop of executing the alarm's outputting, the display unit 101 makes the report of the above stop of executing. In the present embodiment, the above display unit 61 of the alarm device 60 also serves as the display unit 101 of the stop report unit 100, but they may be configured separately from each other. The lamp 102 includes a light-emitting diode (LED), for example. The lamp 102 lights up or blinks, for example, thereby to make the report of stopping of executing the alarm's outputting.

[3. About Hydraulic Circuit]

Then, a hydraulic circuit of the hydraulic excavator 1 is to be described based on FIGS. 1 and 2. The hydraulic excavator 1 is provided with a plurality of hydraulic actuators AC, the hydraulic pump P0 which pumps the pressure oil to the plurality of hydraulic actuators AC, and a pilot pump PP.

For convenience, FIG. 2 shows the hydraulic circuit that corresponds to one hydraulic actuator AC, but the same hydraulic circuit is included in another hydraulic actuator AC.

The plural hydraulic actuators AC include the right and left run motors 22 which are run hydraulic actuators that drive the lower run body 2, the blade cylinder 23a which is a hydraulic actuator that moves the blade 23 up and down, the swing motor 43 which is a swing hydraulic actuator to drive the upper swing body 4, the boom cylinder 31a, arm cylinder 32a and bucket cylinder 33a which are each a work hydraulic actuator that drives the work instrument 3. The blade cylinder 23a, the boom cylinder 31a, the arm cylinder 32a, and the bucket cylinder 33a are collectively referred to as hydraulic cylinders CY.

Also, the hydraulic excavator 1 may be so configured as to have a so-called boom swing function that swings the work instrument 3 (boom 31) right and left relative to the upper swing body 4. When the hydraulic excavator 1 has the boom swing function, the hydraulic cylinder CY also includes a swing cylinder as a hydraulic actuator that swings the boom 31. Generally, the boom swing function is fitted to a mini excavator (small hydraulic excavator) used for construction in a narrow place.

The plurality of hydraulic pumps P0 includes a variable-displacement pump and a fixed-displacement pump, and is driven by the engine 40. The variable-displacement pump pumps the pressure oil to the right and left run motors 22, the boom cylinder 31a, the arm cylinder 32a and the bucket cylinder 33a. The fixed-volume pump supplies the hydraulic oil to the blade cylinder 23a, the swing motor 43, and a swing cylinder (not shown).

The plural actuators AC are provided with direction-switch valves CV respectively corresponding thereto. This direction-switch valve CV is a pilot-type direction-switch valve that can switch the direction and flowrate of the pressure oil pumped from the hydraulic pump P0 (variable-displacement pump or fixed-displacement pump). The direction-switch valves CV of the present embodiment include direction-switch valves corresponding to the right and left run motor 22, a direction-switch valve corresponding to the boom cylinder 31a, a direction-switch valve corresponding to the arm cylinder 32a, a direction-switch valve corresponding to the bucket cylinder 33a, a direction-switch valve corresponding to the blade cylinder 23a, a direction-switch valve corresponding to the swing motor 43, and a direction-switch valve corresponding to the swing cylinder.

The pilot pump PP discharges a pilot oil which serves as an input command to the direction-switch valve CV. The pilot pump PP driven by the engine 40 discharges the pressure oil thereby to generate the pilot pressure in a pilot oil path. The hydraulic excavator 1 is provided with the pilot oil path reaching each of the direction-switch valves CV from the pilot pump PP.

The operation unit 41b has a remote control valve RV for switching the direction and pressure of the pressure oil supplied to the direction-switch valve CV. The pressure oil discharged from the pilot pump PP is supplied to the remote control valve RV. The remote control valve RV generates the pilot pressure in accordance with the operating direction and operating amount of the operation unit 41b. The operation unit 41b includes a run lever for causing the hydraulic excavator 1 to run and an operation lever for operating the work instrument 3, for example.

A solenoid valve SV is provided in the oil path between the pilot pump PP and each remote control valve RV. In response to a control command from the control unit 80, the solenoid valve SV adjusts the pilot pressure generated by the pilot pump PP. Adjusting the pilot pressure can simultaneously stop the driving of the plural hydraulic actuators AC, for example, and also can uniformly control the drive speeds of the plural hydraulic actuators AC.

[4. About Operation]

Figure 3:
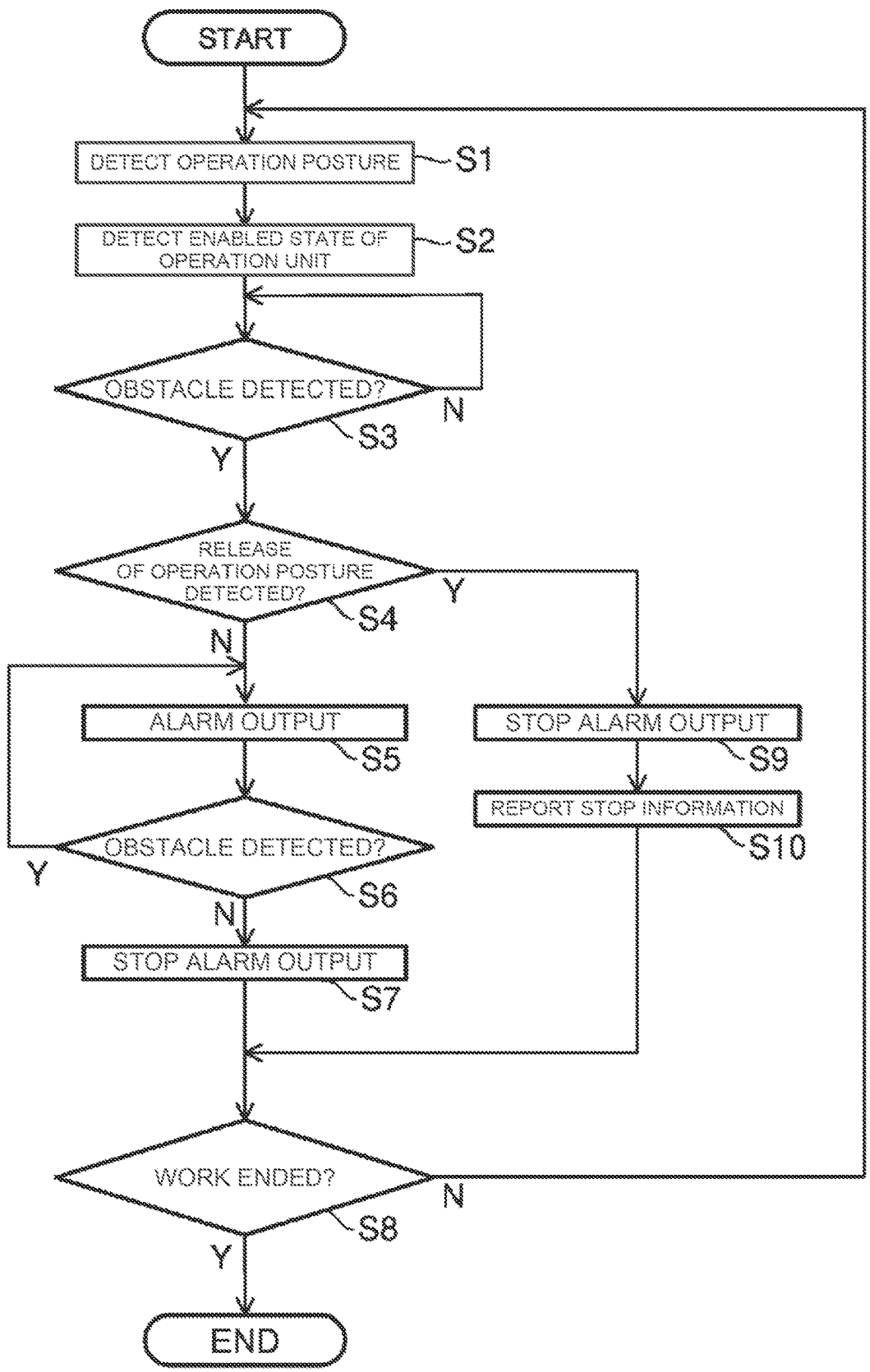
FIG. 3 is a flowchart showing an example of the flow of operations in the above hydraulic excavator.

Then, an operation of the hydraulic excavator 1 of the above configuration is to be described. FIG. 3 is a flowchart showing an example of the flow of the hydraulic excavator 1's operation under the control by the control unit 80. The operator gets in the operation cabin 41 of the hydraulic excavator 1, sits on the seat 41a1 of the operation seat 41a thereby to operate the operation unit 41b (e.g., turn an ignition key), and starts the engine 40; then, the seating-detection switch 71 detects that the operator is seated. When the operator wears the seat belt in the seated state, the belt-wearing detection switch 72 detects that the seat belt has been worn by the operator. That is, the posture detection unit 70 detects that the operator is in a posture for operating the hydraulic excavator 1 (S1).

Then, the operator pressing down the cutoff lever 41c turns ON the cutoff switch 90. That is, the cutoff switch 90 detects that the operation unit 41b is in the enabled state capable of operating (S2). With the operation unit 41b in the enabled state, the operator operates the operation unit 41b thereby to drive the given hydraulic actuator AC, making it possible to cause the hydraulic excavator 1 perform running, swinging, digging, and any other operation.

When the monitoring device 50 detects, during the work by the hydraulic excavator 1, that an obstacle is present around the hydraulic excavator 1 (in S3 Yes); if the posture detection unit 70 has not detected the release of the operation posture of the operator (No in S4), the control unit 80 controls the alarm device 60 thereby to output the alarm that the monitoring device 50 has detected an obstacle (S5). For example, displaying the text information of 'Obstacle detected. Be careful.' at the display unit 61 of the alarm device 60 outputs the alarm. At this time, the alarm outputting may be done by rotating the rotary lamp 62 while lighting the same. Also, the alarm outputting may be done by outputting the buzzer sound from the alarm unit 63 or by outputting the voice that an obstacle has been detected. The three types of alarm outputs by the display unit 61, the rotary lamp 62 and the alarm unit 63 may be simultaneously done, any one may be done, or two of them may be done together.

The alarm outputting in S5 is done as long as the monitoring device 50 is detecting an obstacle (Yes in S6). When the monitoring device 50 no longer detects an obstacle due to an obstacle moving out of a monitoring area of the monitoring device 50 (No in S6), the control unit 80 controls the alarm device 60 thereby to stop the alarm outputting (S7).

Then, ending (S8) of the work by the hydraulic excavator 1 ends a series of processes. Based on the detection signal that is output from a sensor (not shown) when the operation to stop the engine 40 (operation to rotate the ignition key to the OFF position) is done by the operation unit 41b, for example, the control unit 80 can determine whether or not the work has been ended. When the control unit 80 determines in S8 that the work has not been ended, the processes from S1 onward are repeated.

Meanwhile, when the monitoring device 50 detects an obstacle in S3; if the posture detection unit 70 detects the release of the operation posture of the operator (Yes in S4), the control unit 80 controls the alarm device 60 thereby to stop the alarm's outputting that the monitoring device 50 has detected an obstacle (S9). If the operator removes the seat belt and stands up in order to visually check the work site, for example, the belt-wearing detection switch 72 detects the un-worn seat belt, and the seating-detection switch 71 detects the release of the operator's sitting. In this case, assuming that the posture detection unit 70 detects that the operator has released the operation posture, the control unit 80 stops the alarm outputting by the alarm device 60.

Then, the control unit 80 controls the stop report unit 100, and causes the display unit 101 to display information showing that the alarm device 60 has stopped the executing of the alarm's outputting (S10). For example, the display unit 101 is caused to display text information of 'Alarm outputting based on obstacle detection has been stopped'. At this time, simultaneously or instead of displaying on the display unit 101, the lamp 102 may be lit thereby to report that the alarm outputting based on the obstacle detection has been stopped. Then, the process moves to S8, and the same processes as above are done.

[5. Effect]

As described above, when the posture detection unit 70 detects that the operator is in the operation posture (in S4 No), the control unit 80 causes the alarm device 60 to execute the alarm's outputting that is based on the monitoring result of the monitoring device 50 (S5). With this; if a person other than the operator should approach the hydraulic excavator 1 in operation, the person (intruder) can be alerted to be aware of a danger, or the operator is urged to stop operating the hydraulic excavator 1, i.e., to stop working by the hydraulic excavator 1.

Meanwhile, when the posture detection unit 70 detects that operation posture of the operator has been released (Yes in S4), the control unit 80 stops executing of the alarm's outputting that is based on the monitoring result of the monitoring device 50 and that is by the alarm device 60 (S9). In this case, even if the monitoring device 50 detects an abnormality (e.g., an obstacle) in the surroundings when the operator releases the operation posture and performs the visual check, the operator does not feel annoyed by the alarm at all because no alarm is output from the alarm device 60. As a result, the operator can satisfactorily (comfortably) perform the visual check.

When releasing the operation posture thereby to visually check the work site, the operator intermits the operation of the operation unit 41b. Thus, even if an obstacle is present in the monitoring area of the monitoring device 50, the hydraulic excavator 1 is free from performing an operation that makes contact with the obstacle. For example, when the operator has got off the operation seat 41a, the operator can visually recognize an obstacle despite the alarm not output from the alarm device 60, making it possible to take a proper action for the obstacle. For example, when visually checking the intruder, the operator can call out to the intruder to leave the area.

In particular, in the present embodiment, the control unit 80, when the monitoring device 50 has detected an obstacle around the hydraulic excavator 1 (Yes in S3), and if the posture detection unit 70 detects that the operator is in the operation posture (No in S4), causes the alarm device 60 to execute the alarm's outputting (S5). Meanwhile, the control unit 80, when the monitoring device 50 has detected an obstacle around the hydraulic excavator 1 (Yes in S3), and if the posture detection unit 70 detects the release of the operation posture of the operator (Yes in S4), stops the executing of the alarm's outputting by the alarm device 60 (S9).

When an obstacle is detected, by the above control by the control unit 80, during the work by the hydraulic excavator 1, the alarm outputting by the alarm device 60 can ensure work safety. Meanwhile, when the operator releases the operation posture and visually checks the work site, no alarm is output despite detecting of an obstacle, thus making it possible for the operator to concentrate on the visual check work without the annoyance of the alarm.

When the alarm device 60 stops executing the alarm's outputting that is based on the monitoring result of the monitoring device 50, the stop report unit 100 reports that executing of the alarm's outputting has been stopped (S10). In this case, the operator, by the alarm from the stop report unit 100, can recognize that executing of the alarm outputting by the alarm device 60 has been stopped due to the operator's action of releasing the operation posture.

The stop report unit 100 is provided in the operation cabin 41 where the operation seat 41a is placed (see FIG. 1). With this, the operator, when getting off the operation cabin 41 thereby to check the work site, then getting on the operation cabin 41 again, can recognize, by the alarm from the stop report unit 100 provided in the operation cabin 41, that executing of the alarm outputting has been stopped due to the operator's action. Thus, in subsequent drives (operation of the hydraulic excavator 1), it is possible to alert the operator thereby to cause the operator to perform the safe work.

In particular, since the stop report unit 100 includes the display unit 101, the operator can easily recognize that executing of the alarm outputting has been stopped based on the information displayed on the display unit 101.

The posture detection unit 70 includes the seating-detection switch 71. Detecting, by the seating-detection switch 71, the operator's sitting on the seat 41a1 makes it possible to reliably detect whether or not the operator is in the operation posture on the operation seat 41a of the hydraulic excavator 1.

Also, the posture detection unit 70 includes the belt-wearing detection switch 72. Detecting, by the belt-wearing detection switch 72, the operator's wearing of the seat belt makes it possible to reliably detect whether or not the operator is in the operation posture on the operation seat 41a of the hydraulic excavator 1.

[6. Other Operations]

Figure 4:
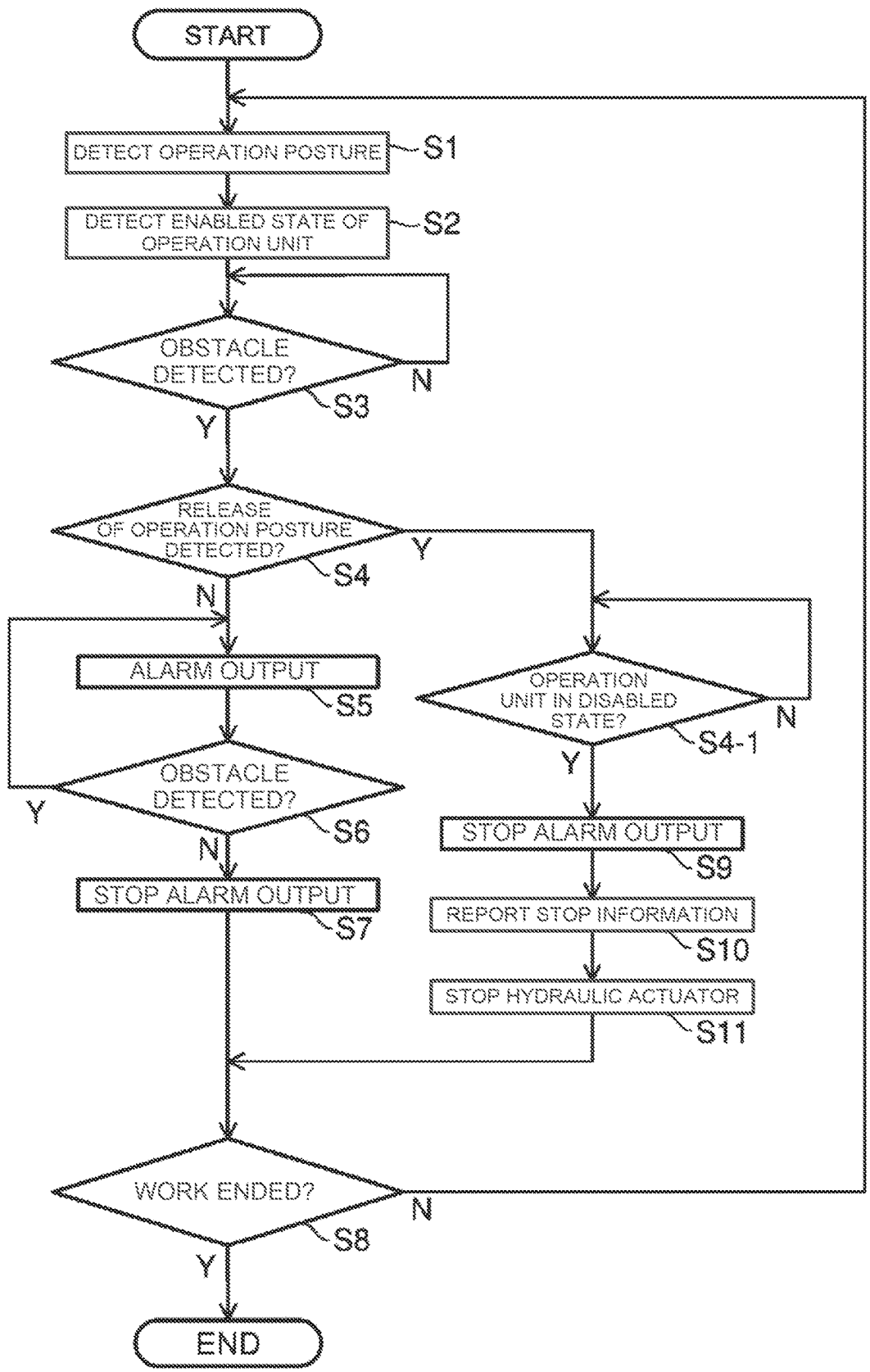
FIG. 4 is a flowchart showing another example of the flow of operations in the above hydraulic excavator.

FIG. 4 is a flowchart showing another example of the flow of operations of the hydraulic excavator 1 under the control by the control unit 80. Processes from S1 to S8 are the same as in FIG. 3. The following is an explanation about the difference from in FIG. 3.

When the monitoring device 50 detects an obstacle in S3, the posture detection unit 70 detects the release of the operation posture of the operator (Yes in S4), and further, the cutoff switch 90 detects that the rotating (pulling up motion) of the cutoff lever 41c by the operator disabled the operation of the operation unit 41b (S4-1), the control unit 80 controls the alarm device 60 thereby to stop the outputting of the alarm that the monitoring device 50 has detected an obstacle (S9).

Then, the control unit 80 controls the stop report unit 100, and causes the display unit 101 to display information showing that the alarm device 60 has stopped the executing of the alarm's outputting (S10). Subsequently, the control unit 80 stops the hydraulic actuator AC (S11). For example, the control unit 80 so make a control as to shut off the current flowing through the solenoid valve SV, thereby making it possible to shut off the pilot pressure sent from the remote control valve RV to the direction-switch valve CV. This can lock (stop) the hydraulic actuator AC. Then, the process moves to S8.

As described above, the control unit 80, when the operation of the operation unit 41b is brought in the disabled state by the cutoff lever 41c, stops executing of the alarm's outputting that is based on the monitoring result of the monitoring device 50 (S4-1, S9) and that is by the alarm device 60.

When getting off the operation seat 41a, the operator normally operates the cutoff lever 41c thereby to disable the operation of the operation unit 41b, and then gets off. When the operation of the operation unit 41b is brought in the disabled state by the cutoff lever 41c, executing of the alarm outputting that is based on the monitoring result of the monitoring device 50 and that is by the alarm device 60 is stopped; thereby, even if the operator gets off the operation seat 41a, the alarm outputting is not executed, thus making it possible for the operator to visually check the work without being annoyed by the alarm. This means that the operator gets off the operation seat 41a and can satisfactorily perform the visual check.

In particular, the control unit 80, when the monitoring device 50 detects an obstacle around the hydraulic excavator 1 (Yes in S3), and if the posture detection unit 70 detects that the operator is in the operation posture (No in S4), causes the alarm device 60 to execute the alarm's outputting (S5). Meanwhile, the control unit 80, when the monitoring device 50 detects an obstacle around the hydraulic excavator 1 (Yes in S3), and if the posture detection unit 70 detects the release of the operation posture of the operator, and if the operation of the operation unit 41b is brought in the disabled state by the cutoff lever 41c (Yes in S4-1), stops the executing of the alarm's outputting by the alarm device 60 (S9).

When an obstacle is detected, by the above control by the control unit 80, during the work by the hydraulic excavator 1, the alarm outputting by the alarm device 60 can ensure work safety. Meanwhile, when the operator releases the operation posture, and the operation of the operation unit 41b is brought in the disabled state by the cutoff lever 41c, the operator, because no alarm is output despite the detecting of an obstacle, gets off the operation seat 41a and can concentrate on the visual check work.

Also, when the operation of the operation unit 41b is brought in the disabled state by the cutoff lever 41c, the control unit 80 stops the hydraulic actuator AC (S11). Stopping the hydraulic actuator AC when the operation of the operation unit 41b is in the disabled state stops the operation (e.g. running, swinging, digging work, etc.) of the hydraulic excavator 1. This allows the operator to get off the operation seat 41a and safely perform the work (e.g., visual check work).

[7. Others]

In the present embodiment, the seating-detection switch 71 and the belt-wearing detection switch 72 each are used as the posture detection unit 70, but an infrared sensor may also be used. The infrared sensor, by detecting the presence (seating) of the operator on the seat 41a1, can detect whether or not the operator is in the operation posture. Also, a sensor that detects capacitance may be used as the posture detection unit 70. For example, it is allowed that the sensor that detects capacitance is mounted to a gripping portion of the control lever included in the operation unit 41b, and detecting, by the above sensor, whether or not the operator has touched the gripping portion of the control lever detects whether or not the operator is in the operation posture.

The stop report unit 100's reporting of the stop of the alarm outputting may be by rotation of the rotary lamp or by the sound output. Also, regardless of the operation posture's detection by the posture detection unit 70 or regardless of the cutoff lever 41c's rotational position (enabled state/disabled state of the operation unit 41b), executing of the alarm outputting by the alarm device 60 may be stopped, and in such a case, the stop report unit 100 may make a report that the above executing has been stopped. In this case, the operator recognizes, by the stop report unit 100, that the alarm outputting has been stopped, and can voluntarily pay attention to the surrounding environment when working by the hydraulic excavator 1.

In the present embodiment, the hydraulic excavator 1 which is the construction machine has been described as the example of the work vehicle, but the work vehicle is not limited to the hydraulic excavator, and may be any other construction machine such as wheel loader, or an agricultural machine such as combine harvester. That is, the control that stops, when the posture detection unit 70 detects that the operation posture of the operator has been released, the executing of the alarm outputting that is based on the monitoring result of the monitoring device 50 is also applicable to a construction device and agricultural machine other than the hydraulic excavator 1.

The embodiment of the present invention has been described above, but the scope of the present invention is not limited thereto, and can be carried out within an extended or modified range without departing from the gist of the present invention.

INDUSTRIAL APPLICABILITY

The present invention is applicable to a work vehicle such as a construction machine and an agricultural machine, for example.

DESCRIPTION OF REFERENCE NUMERALS

1 hydraulic excavator (work vehicle)
41 operation cabin
41an operation seat
41a1 seat
41b operation unit
41c cutoff lever
50 monitoring device
60 alarm device
70 posture detection unit
71 seating-detection switch
72 belt-wearing detection switch
80 control unit
90 cutoff switch
100 stop report unit
AC hydraulic actuator

The invention claimed is:

1. A work vehicle for performing work, the work vehicle comprising:
 a monitoring device configured to monitor an object within a predetermined distance surrounding of the work vehicle;
 an alarm device configured to output an alarm based on a monitoring result of the monitoring device;
 a posture detection unit comprising a seating detection switch configured to detect whether or not an operator is sitting on an operation seat of the work vehicle and a belt-wearing detecting switch configured to detect whether the operator wears a seat belt of the operation seat or removes the seat belt of the operation seat thereby to determine an operation posture of the operator for operating the work vehicle; and a control unit configured to control the alarm device based on a detection result of the posture detection unit,
wherein the control unit is further configured to:
based on a detection of the operator sitting in the operation seat of the work vehicle or the operator wearing the seat belt by the posture detection unit, thereby indicating that the operator is in the operation posture, cause the alarm device to output the alarm that is based on the monitoring result of the monitoring device, and
based on a detection by the posture detection unit that the operator is no longer sitting on the operator seat and removes the seat belt while the alarm is output by the alarm device, cause the alarm device to stop output of the alarm, by the alarm device, that is based on the monitoring result of the monitoring device.

2. The work vehicle according to claim 1, further comprising:
a hydraulic actuator configured to operate the work vehicle,
an operation unit configured to drive the hydraulic actuator, and
a cutoff lever configured to switch an operation of the operation unit between an enabled state that drives the hydraulic actuator and a disabled state that disables driving of the hydraulic actuator,
wherein the control unit is further configured to, based on the monitoring result of the monitoring device, the operation posture of the operator, and an operation of the operation unit being switched to the disabled state by the cutoff lever while the alarm is output by the alarm device, cause the alarm device to stop output of the alarm, by the alarm device, that is based on the monitoring result of the monitoring device.

3. The work vehicle according to claim 2, wherein the control unit is configured to, based on the operation of the operation unit being switched to the disabled state by the cutoff lever, stop the hydraulic actuator.

4. The work vehicle according to claim 2, further comprising:
a cutoff switch configured to detect a rotational position of the cutoff lever,
wherein the control unit is further configured to, based on the rotational position detected by the cutoff switch, determine whether the operation of the operation unit is in the enabled state or the disabled state.

5. The work vehicle according to claim 1, further comprising:
a stop report unit configured to, based on stoppage of the alarm by the alarm device, generate a report that indicates that output of the alarm has been stopped.

6. The work vehicle according to claim 5, further comprising:
an operation cabin in which the operation seat is placed and in which the operator rides, wherein the stop report unit is provided in the operation cabin.

7. A work vehicle comprising:
an operation seat on which an operator of the work vehicle sits when operating the work vehicle;
a first sensor configured to detect objects within a predetermined distance from the work vehicle;
a second sensor configured to detect whether an operator is sitting on the operation seat;
a third sensor configured to detect whether the operator wears a seat belt of the operation seat or removes the seat belt of the operation seat,
a sound emitting device configured to emit an alarm;
a memory storing processor-executable code; and
a processor configured to execute the processor executable code to perform operations including:
controlling the sound emitting device to emit the alarm in response to the first sensor detecting an object within the predetermined distance and the second sensor detecting the operator sitting on the operation seat or the third sensor detecting the operator wearing the seat belt; and
controlling, while the sound emitting device is emitting the alarm, the sound emitting device to cease emitting the alarm in response to the second sensor detecting that the operator is no longer sitting on the operation seat and the third sensor detecting that the operator removes the seat belt.

8. The work vehicle according to claim 7, further comprising:
a hydraulic actuator configured to operate the work vehicle; and
a cutoff lever configured to switch between an enabled state that enables the hydraulic actuator to be driven and a disabled state that inhibits the hydraulic actuator from being driven,
wherein controlling, while the sound emitting device is emitting the alarm, the sound emitting device to cease emitting the alarm is in response to the second sensor detecting that the operator is no longer sitting on the operation seat, the third sensor detecting that the operator removes the seat belt from the operator seat, and the cutoff lever switching to the disabled state from the enabled state.

* * * * *